Jan. 20, 1970 H. WEINSTEIN ET AL 3,491,199

FACSIMILE MULTIPLEX SYSTEM

Filed May 12, 1967 5 Sheets-Sheet 1

INVENTOR.
HILLEL WEINSTEIN
ROBERT J. POTTER

BY Ronald Zibelli

ATTORNEYS

Jan. 20, 1970 H. WEINSTEIN ET AL 3,491,199

FACSIMILE MULTIPLEX SYSTEM

Filed May 12, 1967 5 Sheets-Sheet 2

INVENTOR.
HILLEL WEINSTEIN
ROBERT J. POTTER

BY Ronald Zibelli

ATTORNEYS

INVENTOR.
HILLEL WEINSTEIN
ROBERT J. POTTER
BY
Ronald Zibelli
ATTORNEYS

FACSIMILE MULTIPLEX SYSTEM

Filed May 12, 1967 5 Sheets-Sheet 4

INVENTOR.
HILLEL WEINSTEIN
ROBERT J. POTTER

BY Ronald Zibelli

ATTORNEYS

INVENTOR.
HILLEL WEINSTEIN
ROBERT J. POTTER
BY
Ronald Zibelli
ATTORNEYS

United States Patent Office 3,491,199

Patented Jan. 20, 1970

3,491,199

FACSIMILE MULTIPLEX SYSTEM

Hillel Weinstein, Rochester, and Robert J. Potter, Penfield, N.Y., assignors to Xerox Corporation, Rochester, N.Y., a corporation of New York Filed May 12, 1967, Ser. No. 638,061
Int. Cl. H04n 7/08
U.S. Cl. 178—5.6 3 Claims

ABSTRACT OF THE DISCLOSURE

A facsimile system is set forth according to which portions of the vertical blanking period present in the standard FCC-adopted TV signal are utilized to carry facsimile information to a plurality of stations receiving the freely radiated TV signal. In order to assure that there is no interference with useful portions of the waveform being received by standard TV receivers, the present system makes use of the four or more line intervals following the second group of equalizing pulses in the vertical blanking period to carry the said facsimile information.

Background of the invention

This invention relates generally to facsimile communications systems and more particularly to those communications systems in which transmission of facsimile information is coupled with other information-carrying signals so as to enable more efficient and economical utilization of communications channels.

The development and utilization of high speed facsimile techniques has to a considerable extent been hindered by the fact that suitable communications channels are simply not available in sufficient numbers and/or at low enough costs as to allow the number of individuals who would potentially be interested in facsimile service to take advantage thereof. Although in the case of low speed facsimile the ordinary and plentiful telephone line links may be utilized to carry the electrical impulses representative of the optical information sought to be conveyed, such lines become ineffective where transmission rates exceeding 3,000 bits or so per second are encountered. While utilization of broad band land lines of the Telpak variety enables facsimile communication at relatively high rates—data flow rates of the order of 50 to 200 or so kilobits per second are typical—yet such broad band lines are existent between but relatively few points, and because of the very high cost involved in constructing such facilities it does not appear likely that these lines will become available on a general basis. Furthermore, it should be clear that even were such broad band lines available at reduced cost it would hardly do for such complex transmission means to be connected to the myriad of limited users, as for example ordinary home owners who might be interested notwithstanding their noncommercial status in receiving facsimile information relating to newspaper or the like.

In addition to the use of the aforementioned communication facilities for transmission of facsimile information, must be mentioned the alternative use of microwave links. The use of these latter techniques can largely eliminate the speed of transmission limitations inherent in the conductive cable systems. However in addition to the tremendous cost of building and maintaining complex microwave communication facilities, is the fact that such channels are limited in number to those authorized by governmental regulatory agencies; furthermore these dedicated channels may be utilized only to a degree consistent with regulations promulgated by such agencies. Because of the several factors that have been mentioned it follows that the use of microwave facilities for transmission of facsimile information—especially to the relatively small user—is an impractical, and certainly in terms of cost, prohibitive, operation.

In an effort to overcome the difficulties inherent in those other techniques that have been described for transmission of facsimile information, systems have been proposed wherein facsimile signals may be multiplexed with television signals so that facilities already existent for transmission of such television signals may be simultaneously utilized for transmission of facsimile information. A system of this general type is disclosed, for example, in U.S. Patent 2,874,213 to George L. Beers. The difficulty with such systems as have been proposed in the past, however, has been that they have been directed only toward utilization of the so-called "network links" that run between major cities in the United States and other countries. That is to say that such prior systems were conceived to take advantage of the existent coaxial links present between various TV broadcasting stations. There has been no thought or attempt in such prior art to enable the information thus relayed from station to station to be passed directly to the general user via freely radiated signals. It could therefore be said that the TV-facsimile multiplex systems proposed in the past art have not led to results considerably different from those achievable by the techniques that have been earlier described of transmitting facsimile information over broad band land lines, except to the extent that utilization of land lines already engaged in transmission of television information does effect economies when compared to the expenditures which would be necessary were new facilities constructed in their entirety.

Summary

In accordance with the foregoing it may be regarded as an object of the present invention to provide a facsimile multiplexing system by the use of which facsimile information may be transmitted via existing communications channels to a plurality of users.

It is a further object of the present invention to provide a facsimile multiplexing system by the use of which facsimile information may be simultaneously disseminated to the plurality of users within range of freely radiated TV signals.

It is a still further object of the present invention to provide multiplexing techniques whereby facsimile information may be so added to a standard TV signal that the resulting complex waveform may be radiated and received without any detrimental change in the TV signal.

It is yet an additional object of the present invention to provide a facsimile multiplexing system which enables the utilization of simply modified TV receivers as receiving terminals for facsimile information.

Now in accordance with the present invention these objects, and others as will become apparent in the course of the ensuing specification, are achieved by means of a multiplexing system enabling injection of facsimile information into a standard TV signal during specific portions of the vertical blanking period normally present in such signals. In a preferred embodiment of the present system the facsimile information is injected into the TV signal during the four or more line intervals following the second group of equalizing pulses in the vertical blanking period. As the particular portion of the vertical blanking periods specified normally carries no useful information, the technique set forth assures that no detrimental distortion of the waveform will result. The resulting composite TV-facsimile waveform will in most instances be transmitted from the originating point via existing communications links (such as TV network links) to the general area of destination. In a typical case the composite signal will then be freely radiated from a TV broadcasting station or the like, and received at one or more receiving stations. Such stations will essentially comprise ordinary TV receivers modified to the extent that the multiplexed facsimile information may be separated from the TV signal and converted into a visually acceptable form, such as, for example, a hard replica of the orginal data being transmitted.

Brief description of the drawing

A fuller understanding of the present invention and of the manner in which it operates to achieve the objects previously identified, may now best be gained by a reading of the following detailed specification, and by a simultaneous examination of the drawings appended hereto in which.

Description of the preferred embodiment

Figure 1:
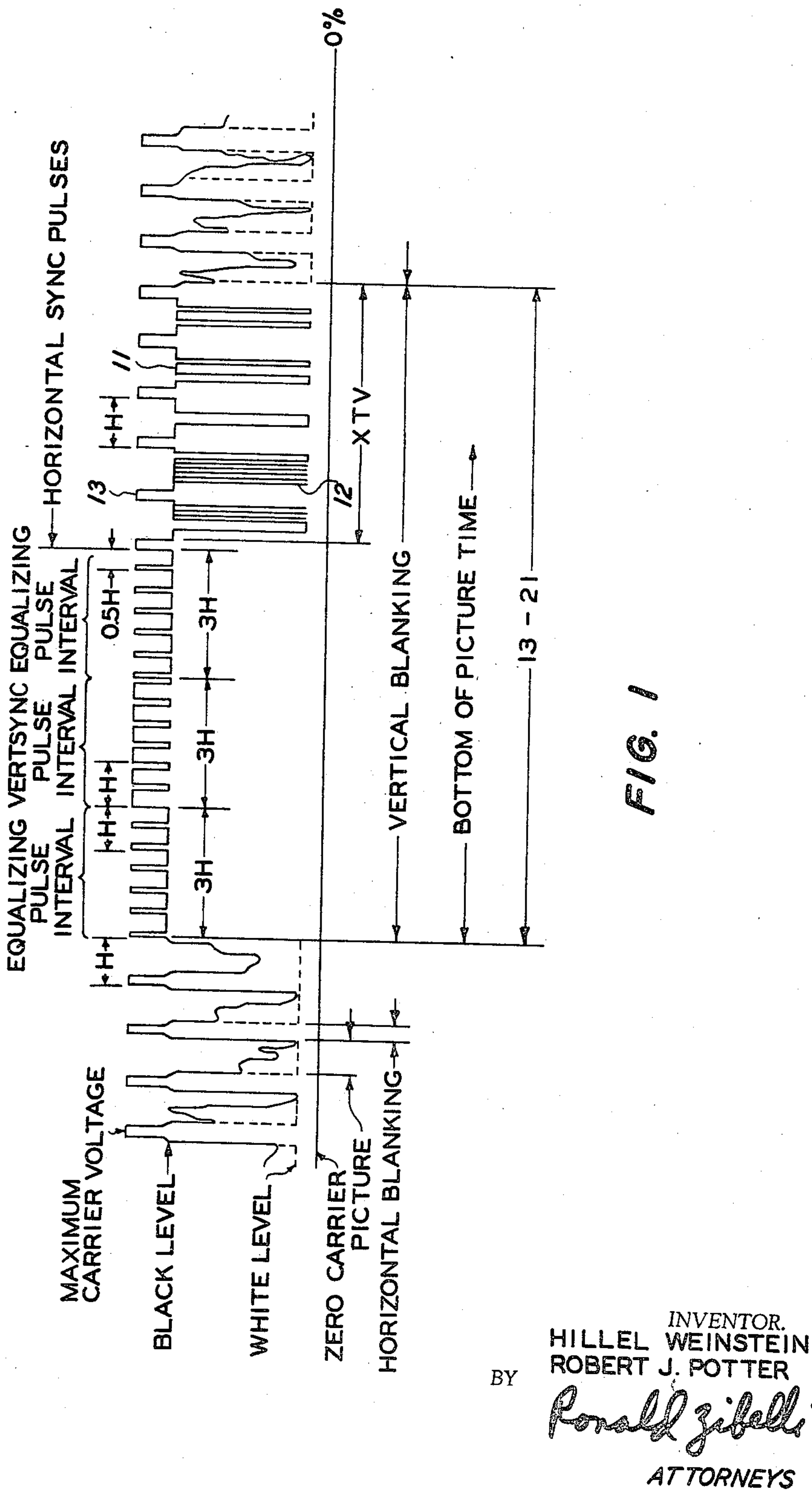
FIGURE 1 is a graphical showing of the standard television signal utilized in the United States and illustrates the portion of the signal upon which facsimile information is injected in accord with the present invention.

FIGURE 1 depicts a representative waveform that results from practice of the present invention. With the important exception of that portion of the waveform identified in the diagram as "XTV," the signal format shown is essentially the standard television signal prescribed by Federal Communications Commission and in uniform use throughout the United States. The symbol "XTV" has no standard meaning in the art but merely represents a convenient abbreviation suggested to the inventors by the fact that a Xerographic terminal has in practice been utilized as a print-out for the TV-facsimile system taught in the present invention. The diagram of FIGURE 1 carries descriptive designations for the several portions of the signal and it is thought that no comment need be introduced relevant to those portions of the signal other than the XTV region, in that all other aspects of the signal are completely conventional and well understood by those familiar with the art of television engineering.

In accordance with the present invention it will be noted in FIGURE 1 that that portion of the vertical blanking period following the second group of equalizing pulses and identified in the diagram by the designation "XTV," takes on a form quite different from the conventional TV signal. In the usual practice of television broadcasting, and as is well known in the art, this portion of the composite TV waveform contains four or more horizontal sync pulses 13, which in such prior practice terminate at the dotted line 11—well above the black level. According to the present invention, however, the carrier signal is modulated between the several horizontal sync pulses 13 to produce a resulting envelope as at 12, which envelope is representative of facsimile information injected into the composite signal. As the XTV portion of the composite signal normally carries no useful information, but merely represents a buffer period wherein the completion of retrace is effected, facsimile information may be injected in the manner shown in the figure without in any manner whatsoever detrimentally affecting the orderly operation of conventional TV receivers whose input is the composite signal. This is to say that the signal shown in FIGURE 1 may be readily transmitted from point to point in a TV network, freely radiated to receivers and so forth, without the necessity of first "cleaning up" the signal in any way whatsoever. That this is indeed the case will be demonstrated in the ensuing description of a specific apparatus embodiment of the invention.

Before turning our attention from FIGURE 1 one additional point should be noted. While FCC proscription assures the presence of at least four horizontal sync pulses in the XTV region of the signal, the same regulatory agency allows up to twelve sync pulses to be utilized in this region where the individual broadcaster so desires. In the Rochester, N.Y. area, where the inventors reside, for example, ten such intervals are typically present. In practice this means that facsimile data fed into the XTV region may be injected at a slower rate and transmitted over a larger period of time at the end of the vertical blanking period, or in the alternative more data can be sent for a given period.

Figure 2:
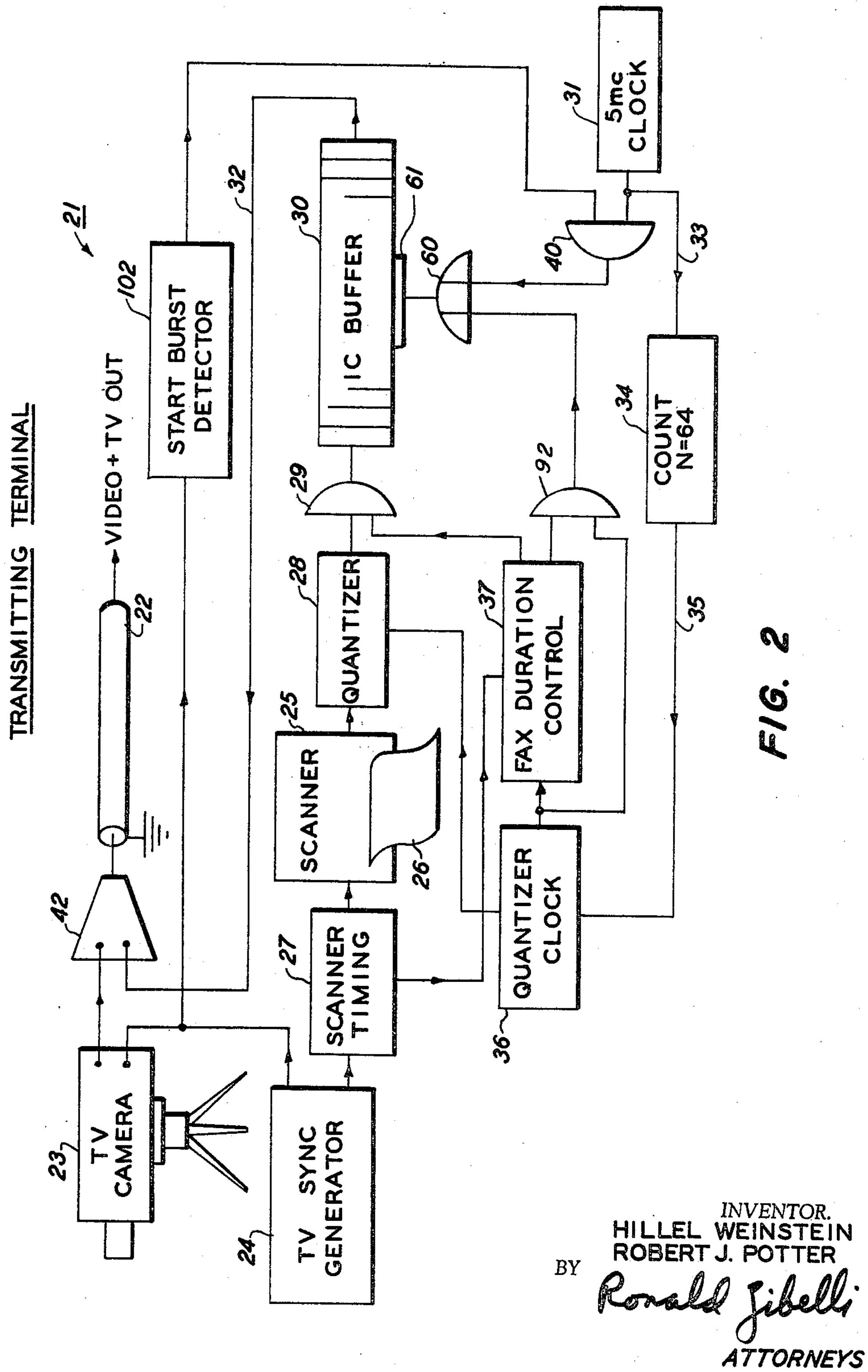
FIGURES 2 and 2A are simplified block diagrams depicting a representative television-facsimile system constructed in accord with the present invention.

In FIGURE 2 a detailed block diagram is shown depicting how a complete television-facsimile multiplexing system may be operated in accord with the present invention. In the discussion that now ensues in connection with this figure, various parameters may from time to time be specified, particularly in connection with timing elements of the system. It should be understood that such exemplary figures are intended merely to assist the reader in achieving a concrete understanding of the invention, and are not intended to serve as limitations upon the system otherwise disclosed and claimed.

In FIGURES 2 and the 2*a* facsimile multipiplexing system is seen to consist broadly of a transmitting terminal 21 and a receiving terminal 41. For purposes of illustrating the present invention the two terminals are considered to be associated in a closed circuit television system. This is to say that we are considering for illustration the case where the composite waveform is applied directly to an output coaxial cable 22 at the transmitting terminal 21, which cable directly couples to or is integral with an input coaxial cable 43 at receiving terminal 41. It should, however, be completely obvious that the two cables 22 and 43 can be coupled to transmitting and receiving antennas respectively so that energy is transferred between transmitting and receiving terminals by a freely radiating signal. This is to say that one may in this discussion consider the transmitting terminal to be centered at a TV broadcaster station or the like, in which case cable 22 would be the lead-in to the broadcasting antenna. Similarly the receiving terminal could under the same set of conditions be considered to be present at a point remote from the TV broadcast station, with the reception from the latter occuring via a receiving antenna coupled to transmission line 43.

In FIGURE 2 a TV sync generator 24, standard in the art, provides timing and synchronizing pulses for the operation of a conventional standard TV system including the conventional TV camera 23. The waveform produced by TV sync generator 24 is the standard FCC signal uniformly utilized in the United States. As has already been discussed, this waveform is essentially that shown in FIGURE 1 minus the modifications in the composite wave introduced in the XTV region of the latter figure. Of course if operation outside of the United States is considered then various modifications in this signal may be present. However the overall operating principles of the invention would not vary.

In FIGURE 2 a facsimile scanner unit 25 provides electrical signals indicative of intelligence contained on a document 26 which is to be reproduced at the receiving terminal 41. Facsimile scanner 25 will normally be a commercially available unit of the type adapted to linearly scan a document—as with a cathode ray tube spot or the like—and convert the optical characteristics of the document so scanned into an electrical signal indicative of the optical information. For purposes of the present specification, for example, scanner 25 may be considered to be the unit of this type incorporated into the facsimile communications system available from the Xerox Corporation of Rochester, N.Y., under the designation "LDX." This same unit is described, among other places, in United States Patent 3,149,201 to C.L. Huber et al. In the present system timing for scanner 25 is derived from TV sync generator 24. Scanner timing block 27 is intended to derive control pulses that activate scanner 25 in accordance with the physical limitations of the particular scanning unit used. The manner in which scanner block 27 functions to activate scanner 25 is shown in detail in FIGURE 3 and will be discussed in connection with the description of that figure. Briefly it may be stated that the scanner timing is directly obtained from the rising or the falling edge of the vertical sync pulse. Under such conditions it follows that the scanner 25 will be triggered every 1/60 of a second for standards prevailing in the U.S.A., and utilizing the particular scanner previously identified one line of data will be thereby scanned.

The LDX scanner referred to as a suggested unit for scanner 25 is of a type utilizing decision circuitry which quantizes a scanned line of data into bits of one or zero value indicative respectively of black or white; this is to say no grey level is present. Quantizer 28 may be considered to contain this decision making circuitry and thus functions to assign two levels of voltage or current to black and white respectively. Circuitry adapted for achieving such results with the LDX scanner mentioned is disclosed in pending application Ser. No. 329,641, filed by S.E. Townsend, Dec. 11, 1963 which issued May 30, 1967 as U.S. Patent No. 3,322,893; other commercial units are available, however, which will achieve similar quantizing action. The output from quantizer 28 is fed via AND gate 29 into buffer 30. However, the present invention may also be adapted to the transmission of intermediate levels, such as various shades of gray. One simple method to achieve this would utilize amplitude coding in terms of digital signals, in a manner completely analogous to pulse code modulation (PCM) systems that are well known in the electronic art.

In the present instance buffer 30 is of the integrated circuit variety as is sugested by the designation in the diagram; however the buffer need not be of integrated circuit design but may for example be a chain of flip-flops in the conventional register form well-known in the computer art, or alternatively it may be a simple delay line in which data is entered at a certain rate and sampled at a different rate. The main function of buffer 30 is to achieve a match between the relatively slow flow rate of data emerging from quantizer 28—which rate is limited by the speed of scanner 25,—and the flow rate at which data is to be fed into the TV channel which is very high by virtue of available large band width in standard TV networks. A free running clock 31, which is not necessarily synchronized with the TV sync signal derived from sync generator 24, provides the shiftout rate for buffer 30, that is to say the rate at which data is shifted out of buffer 30 and via line 32 into the TV channel. By counting down the clock 31 a slow data rate is derived for a shift-in control of buffer 30. Thus we see that signals from the clock 31, representatively shown as 5 mc. are fed by line 33 into counter 34 which as is suggested in the figure derives an output pulse for every 64 input pulses. It will of course be understood that the particular count down rate of counter 34 is chosen in accordance with the specific operating characteristics of the scanner utilized. The signals derived from counter 34 which are at a frequeny of 78 kc. are fed via line 35 into quantizer clock 36 which reshapes the pulses and routes them to fax duration control 37 and to quantizer 28 which determine the sampling rate for data fed into buffer 30.

Fax duration control 37 simply enables AND gate 29 which feeds data into buffer 30 while the scanner is scanning a line. It thus disables it while the scanner is not in operation. For example one line of scan for an 8½ inch wide paper may, with the representative LDX scanning unit utilized, be considered as a chain of 1024 pulses. To scan such a line may take 10 milliseconds. During this period quantizer 28 feeds data into buffer 30 since AND gate 29 at the input thereof is enabled by fax duration control 37.

For purposes of the shift-out operation from buffer 30 a control signal is derived directly from the five megacycle clock at 31. AND gate 40 at the output of clock 31 is enabled by a signal from start burst detector 102 which is activated at the end of the vertical blanking signal, which is to say when we are ready to feed data into the TV channel. This is illustrated in detail in connection with FIGURE 3 and will be discussed subsequently. When AND gate 40 is enabled, OR gate 60 in turn activates shift control 61 so that data is shifted out of buffer 30 at a high rate, for example, at the rate of five megacycles in the specific illustration given here. Output data from buffer 30 passes by a line 32 to video gate 42, thence directly into a cable as at 22 for a closed circuit TV system or into a transmitting antenna for a wireless system. The data is then propagated and fed into a typical TV receiver.

Figure 2A:
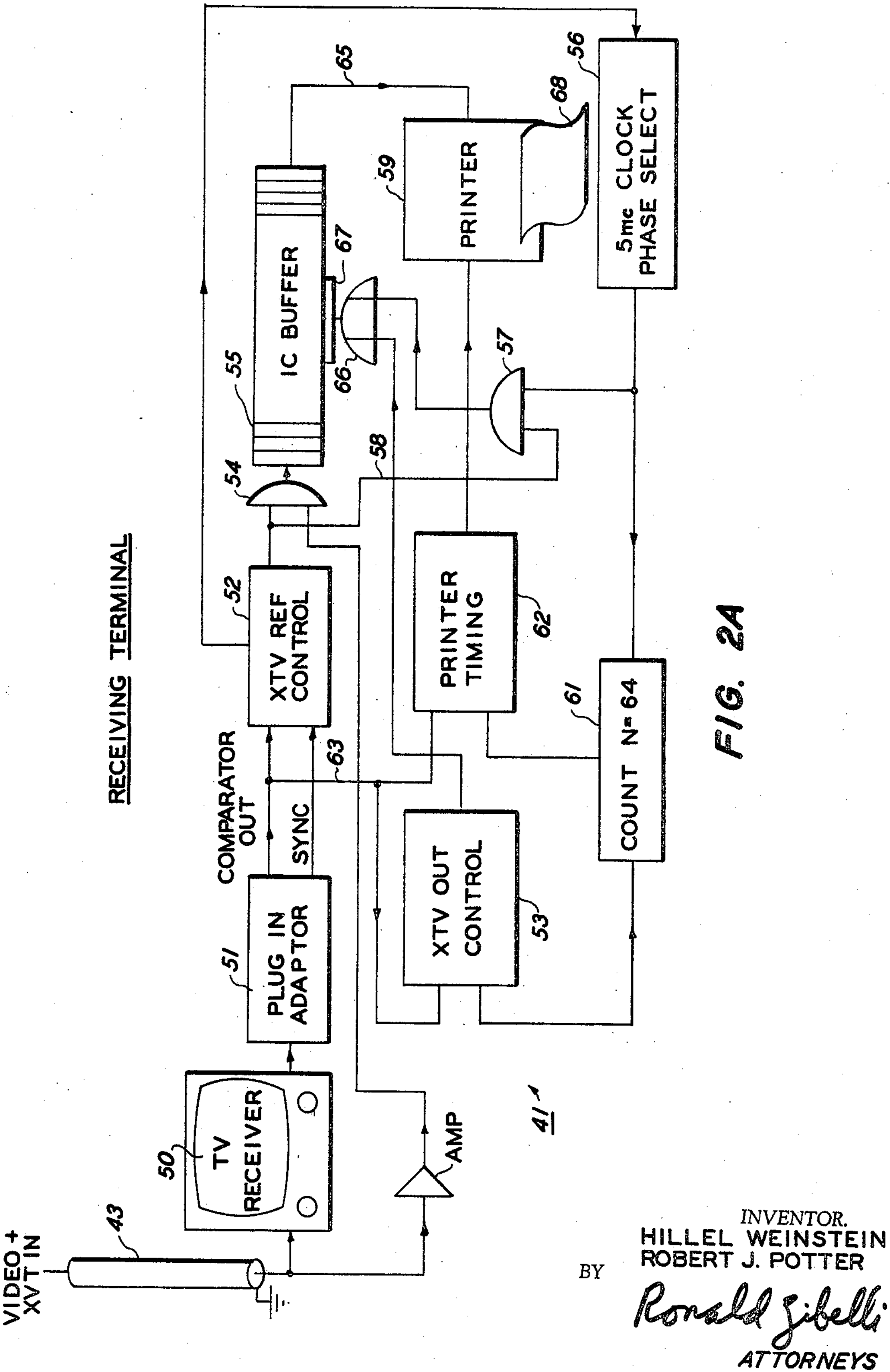

As has been indicated previously, the data present in the composite video and TV signal in cable 22 does not interfere with the orderly operation of an ordinary TV receiver such as at 50 in FIGURE 2*a* since its position in the XTV region identified in FIGURE 1 assures that the data appears only at the upper edge of the receiving tube and thus is not actually displayed. A simple plug-in adaptor 51 can be attached to TV receiver 50 and is utilized to derive impulses for the receiving terminal 41. The plug-in adaptor 51 is simply an amplifier connected to a point at the TV receiver at which a TV sync signal is obtainable. The amplifier will be chosen to display sufficiently high impedance characteristic so that it does not interfere in any way with the orderly operation of the TV receiver. The plug-in adaptor 51 essentially becomes a clock which operates at a rate compatible with the vertical sync signal. As is suggested in the figure, the plug-in adaptor may derive its signal at the comparator circuit of the TV receiver. Alternatively the vertical sync signal can be filtered to provide a proper synchronization signal. Timing and synchronizing signals from plug-in adaptor 51 are fed into XTV reference control 52 and into XTV output control 53. XTV reference control 52 enables AND gate 54 at the input of buffer 55 during the time at which facsimile data is being received, namely, at the end of the vertical blanking signal. This data is fed into the output buffer 55 at a high rate as, for example, five megacycles. The shift-in rate is derived from the five megacycle clock 56 which in the particular case shown here is operated in a phase selected mode. Phase selection is a well known art and is simply utilized to make sure that we always start at the proper time interval.

As has been indicated in connection with the description of transmitting terminal 21, data fed into buffer 55 is in the form of ones and zeros because of the quantizing action at the transmitting terminal. The data is transmitted into buffer 55 through AND gate 54 which in turn is enabled by XTV reference control 52. While data is being fed into output buffer 55 the shift-in control command is provided via phase select clock 56 which is gated through AND gate 57. AND gate 57 is in turn enabled during the period during which facsimile data is ready to be fed into the buffer 55 by a signal derived from XTV reference control 52 and fed via line 58. Once stored in buffer 55 data is ready to be shifted out at a slower rate which is compatible with the response characteristics of the facsimile printer 59.

In the present instance we may assume that the facsimile printer 59 utilized is that unit designed for use in the LDX system produced by the Xerox Corporation of Rochester, N.Y., previously alluded to. In point of fact, data is shifted out of buffer 55 at a rate compatible with the rate at which data was shifted in at transmitting terminal 21, and particular components are so arranged that division by 64 occurs at counter 61. The 78 kc. signal deriving from counter 61, after this division process, is fed to printer timing block 62 which directly connects to facsimile printer 59 and synchronizes the latter with the data flow rate actually used. Printer timing block 62 is adjusted so that it initiates a print line in an appropriate time interval. Plug-in adaptor 51 is seen to provide a vertical sync signal via line 63 to printer timing block 62 and the latter functions in combination with the proper slow rate of data derived from five megacycle clock 56 (78 kc. in this particular case) so as to enable printer 59 to operate at appropriate rates. Meantime facsimile data emerging from buffer 55 is fed to printer 59 via line 65 at the 78 kc. rate derived as a result of signals entering OR gate 66 from XTV output control 53 and activating shift control 67. As a result of the foregoing operations, a facsimile reproduction of the input document 26 appears at 68.

Figure 3:
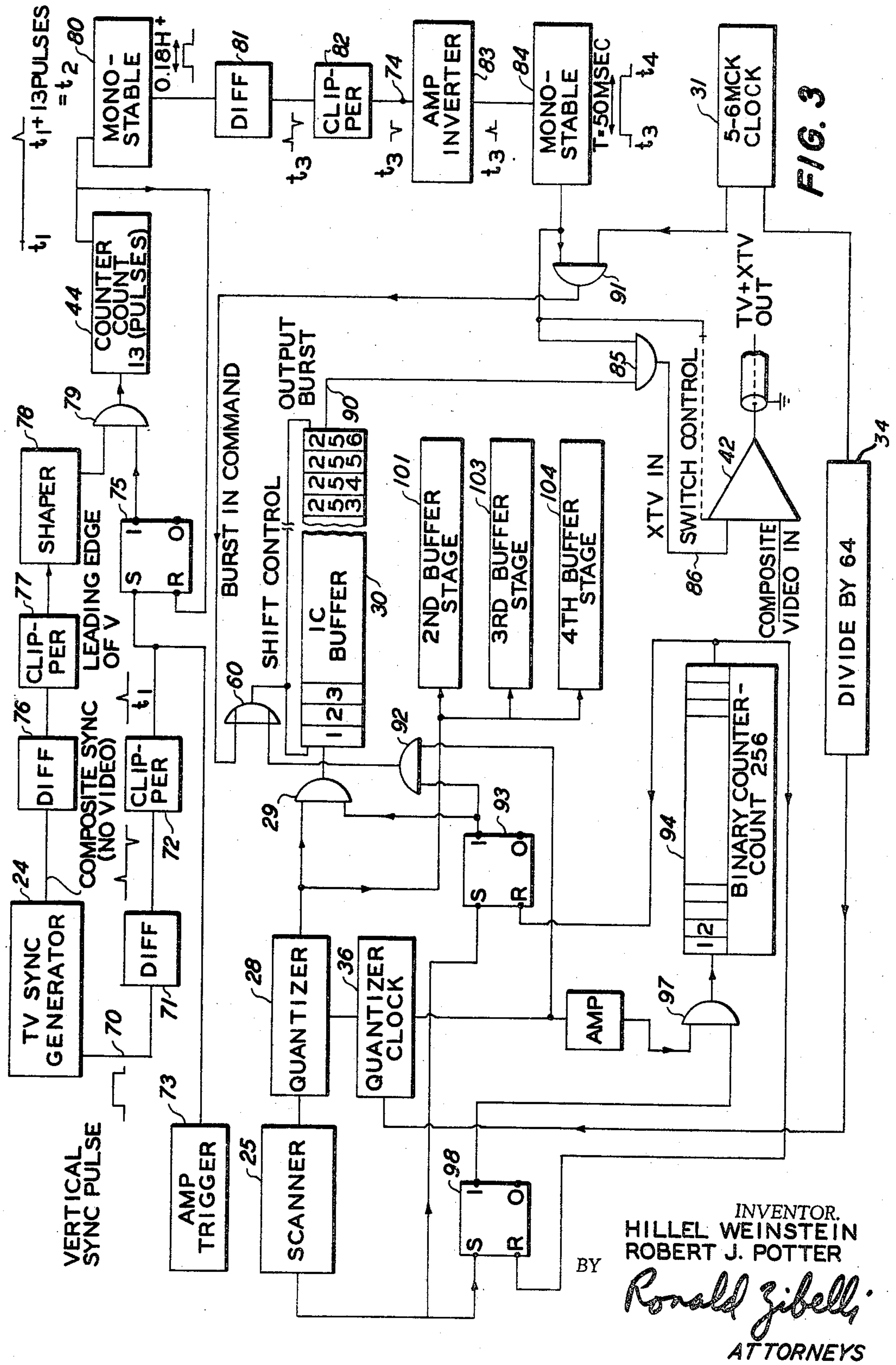
FIGURE 3 is a detailed schematic diagram of the transmitting terminal blocked out in FIGURE 2.
Figure 4:
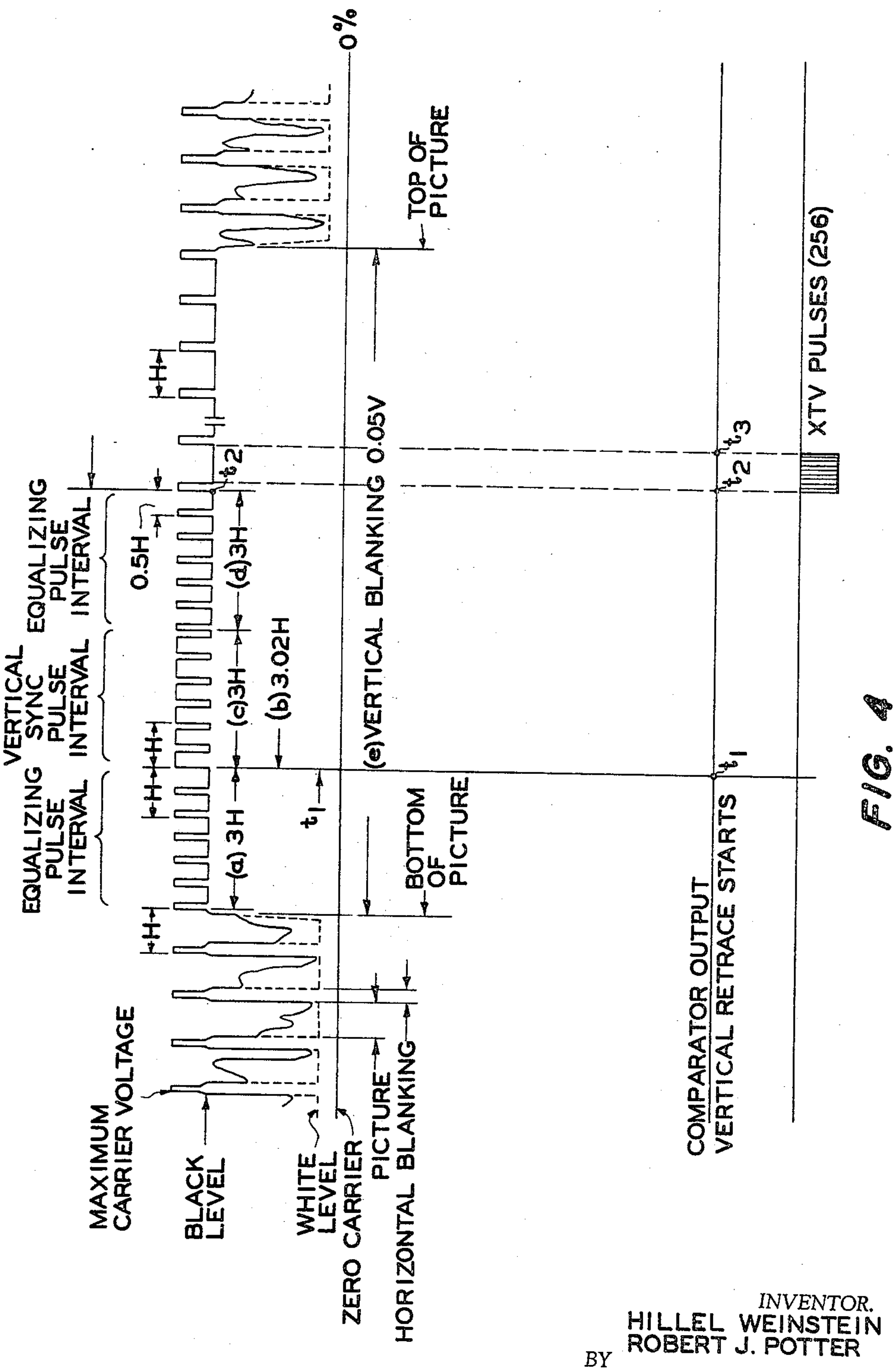
FIGURE 4 is a detailed timing diagram, which when read in conjunction with FIGURE 3 enables identification of the points in time at which various actions occur at the transmitting terminal shown in the latter figure.

In FIGURE 3 a schematic diagram is shown detailing yet further the representative transmitting terminal 21 of FIGURE 2. The diagram is intended to demonstrate how specific components may be arranged to achieve the operation of transmitting terminal 21, but it should be borne in mind while examining FIGURE 4 that with but relatively minor modifications transmitting terminal 21 becomes receiving terminal 41, in that the latter essentially comprises means to invert the operations performed at the former.

In FIGURE 3 reference numerals are used corresponding to the numerals identified with corresponding portions of the system in FIGURE 2. Waveforms are shown in FIGURE 3 in a number of instances adjacent the element where the event depicted in the waveform occurs. In some of these cases the waveform will not be otherwise explicitly described, but its presence should nevertheless be of assistance in understanding the operation of the present system. In considering FIGURE 3 reference should be had simultaneously to FIGURE 4 wherein a timing diagram is shown based on the modified standard FCC video signal previously described in connection with FIGURE 1.

Scanner timing is derived directly from the vertical sync pulses of a standard TV sync generator 24, which after being differentiated at 71 and clipped at 72 are fed to amplifier 73 which periodically triggers scanner 25. Analog data from scanner 25 corresponding to one line of scan is quantized to a 1 or 0 level by quantizer 28. At point 74 a "gate FAX in" command is derived by counting in this representative case 13 pulses that have been in turn derived from the composite sync signal. More specifically with flip-flop 75 initially set at the level by the vertical sync pulse through lead 70—so as to enable AND gate 79—a composite sync signal (minus video) is fed from sync generator 24 through differentiator 76, clipper 77 and DC level shift and pulse shaper 78 into the enabled AND gate 79. Time $t_1$ both in FIGURES 3 and 4 corresponds to the beginning of the arriving edge of the vertical sync pulse. Time $t_1+13$ or $t_2$ corresponds to the arriving edge of the first horizontal sync pulse at the end of the vertical blank. At $t_2$ monostable 80 receives a pulse from counter 44 (set to count 13 pulses) and derives the pulse form shown to the right this element, which pulse is approximately .18 H long. The falling edge of this pulse yields $t_3$ which is a convenient period at the end of the first horizontal pulse following the vertical blanking period during which facsimile information can be inserted into the TV channel. After differentiation at 81 and clipping at 82 the command corresponding to $t_3$ is derived from an amplifier inverter 83. This command in turn activates monostable 84 which derives a pulse which is approximately 50 micro-seconds wide—corresponding to a period between two horizontal pulse intervals—during which facsimile data can be transferred into the TV channel. This enabling pulse is transferred from monostable 84 to one input of AND gate 85; the other input to this gate is the outpu from buffer 30. Facsimile information emerges via lead 86 and at video gate 42 is combined with the composite video signal and thence fed into a wireless or cable system in a manner as has been previously described. It should be noted that the output from counter 44 is simultaneously used to disable flip-flop 75 so that no data is fed into counter 44 at the end of the facsimile transmission duration period.

We now turn our attention to the manner in which data is loaded in and out of buffer 30. Data is shifted out of buffer 30 via line 90 through a control derived from AND gate 91 which feeds OR gate 60 on the shift control. AND gate 91 is seen to combine both the command from monostable 84 and the signal deriving from the free running clock 31 previously referred to in connection with FIGURE 2. For purposes of feeding data into buffer 30 a pulse is derived from amplifier trigger 73 and fed thence to flip-flop 93. As has previously been indicated in connection with FIGURE 2, data in our representative case is quantized at a rate 64 times lower than the rate of free running clock 31. The data is fed into buffer 30 via AND gate 29 which is enabled by flip-flop 93. Flip-flop 93 is reset every 256 pulses via the eight-stage binary counter 94. The purpose of the resetting operation—which acts to disable AND gate 29—is to assure that during the second horizontal sync pulse interval (see FIGURE 4) no data is fed into buffer 30, but rather into a second buffer stage 101. This is to say that all data-feeding to buffer 30 is achieved in time intervals such as that encompassed in $t_3$ to $t_4$ of FIGURE 3. At the end of $t_4$ flip-flop 93 disables the input AND gate 29 to buffer 30, and the operation is consecutively repeated until all required data is fed into the various buffer stages. The detailed logic associated with each of the successive buffer stages 101, 103, 104 etc. is not shown, but may be assumed essentially identical as the logic associated with buffer 30. Each buffer stage it will be noted is presumed for purposes of the illustrative system shown to have a capacity of 256 bits. Counter 94 has a feedback path via flip-flop 98, which is reset at the end of the 256 count, thus stopping counter operation until the arrival of the next vertical sync pulse at flip-flop 98. Of course if a transmission of more than 256 bits is required during subsequent horizontal time intervals, counter 94 will be designed to count more than 256 bits as appropriate.

It should be noted that while frequent reference has been made to a TV receiver, such a receiver in the conventional sense is not required. Rather it is sufficient to provide as a receiving means appropriate antenna and tuning means to receive and separate the facsimile signals prior to their visual reproductions.

Having thus described the present invention it should be evident that those skilled in the art may now readily devise numerous modifications thereof and variations thereupon without yet departing from the true scope of the teaching. Accordingly, the teaching set forth herein should be broadly construed and limited only by the scope and spirit of the claims now appended hereto.

What is claimed is:

1. A facsimile-television multiplexing and transmission system comprising:

(1) a transmitting terminal including (a) a source of composite TV signals, each composite signal including in time sequence vertical synchronizing pulses, equalization pulses, and horizontal synchronizing pulses, (b) means for impressing television information on said TV signals, (c) facsimile scanner means for converting intelligence on an original document into electrical facsimile signals indicative of said intelligence, said facsimile scanner means being electrically connected to said source of composite TV signals so that timing of said scanner operation is associated with predetermined portions of said composite signal, (d) buffer means electrically connected to the output from said scanner means for accepting data flow therefrom in accord with the characteristics of said scanner means;

(e) facsimile multiplexing means electrically connected to said source of composite signals and to the output of said buffer, said multiplexing means being adapted for gating facsimile data from said buffer during a predetermined portion of said composite signal, (f) video gate means connected to receive the gated output from said buffer and the composite TV signal impressed with said television information and transmit the combined signal to an output line for transmission to a receiving terminal;

(2) said receiving terminal including:

(a) receiving means for said combined TV-facsimile signal, (b) separating means electrically connected to said receiving means and adapted to separate said facsimile signals from said TV signals, said separating means including means to derive a sync signal from said TV signal, (c) buffer means connected to the output of said separating means and adapted to accept the facsimile data flowing therefrom at the rate of transmission thereof, (d) printer means electrically connected to the output from said buffer means and adapted to convert said facsimile signals flowing therefrom to intelligence on a viewing surface identical with said intelligence of which said signals are representative, (e) facsimile output control means electrically connected to said buffer means and to timing signals derived from said sync signals, said control means being adapted to gate out said facsimile signals from said buffer in accordance with said derived timing signals, and (f) printer timing means adapted to activate said printer in accordance with timing pulse received at said means from said output control.

2. A facsimile-television multiplexing and transmission system as defined in claim 1 wherein:

(a) said facsimile scanner means includes means coupling vertical synchronizing pulses thereto for triggering said scanner means; and wherein (b) said facsimile multiplexing means includes flip-flop means responsive to the leading edge of the lead vertical synchronizing pulse in each of said composite signals for gating therethrough a predetermined number of said vertical and horizontal synchronizing and equalization pulses and further includes counter means responsive to said predetermined number of pulses gated through said flip-flop means for generating a facsimile gating signal of a duration sufficient to allow data from said buffer means in said transmitting terminal to be passed to said video gate means.

3. A facsimile-television multiplexing and transmission system as defined in claim 1 wherein said buffer means in said transmitting terminal includes:

(a) a storage register;

(b) first gating means responsive to the leading edge of the lead vertical synchronizing pulse in each of said composite signals for gating to said storage register said electrical facsimile signals from said scanner means;

(c) clock means for generating two sets of pulses at a first and second predetermined rate respectively, (d) second gating means responsive to said leading edge and said pulses at said first rate for generating a pulse train during a period of time following said leading edge;

(e) third gating means responsive to said pulse train and said pulses at said second rate for gating said facsimile signals into and out from said storage register, respectively.

References Cited

UNITED STATES PATENTS

| | | | |
|---|---|---|---|
| 2,874,213 | 2/1959 | Beers | 178—5.6 |
| 3,017,457 | 1/1962 | Johnson | 178—6 |
| 3,369,073 | 2/1968 | Scholz | 178—6.6 |

JOHN W. CALDWELL, Primary Examiner

ROBERT L. RICHARDSON, Assistant Examiner